(12) United States Patent
Weston (10) Patent No.: US 11,103,826 B2
(45) Date of Patent: Aug. 31, 2021

(54) USE OF TYPE V ADSORBENT AND GAS CONCENTRATION FOR GAS ADSORPTION AND CAPTURE

(71) Applicant: ExxonMobil Research and Engineering Company, Annandale, NJ (US)

(72) Inventor: Simon C. Weston, Annandale, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 317 days.

(21) Appl. No.: 15/977,281

(22) Filed: May 11, 2018

(65) Prior Publication Data

US 2019/0022573 A1    Jan. 24, 2019

Related U.S. Application Data

(60) Provisional application No. 62/534,278, filed on Jul. 19, 2017.

(51) Int. Cl.
| *B01D 53/02* | (2006.01) |
| *B01D 53/04* | (2006.01) |
| *B01J 20/32* | (2006.01) |
| *B01J 20/22* | (2006.01) |
| *B01D 51/10* | (2006.01) |

(52) U.S. Cl.
CPC ......... *B01D 53/0462* (2013.01); *B01D 51/10* (2013.01); *B01D 53/02* (2013.01); *B01D 53/0438* (2013.01); *B01J 20/226* (2013.01); *B01J 20/3206* (2013.01); *B01J 20/3248* (2013.01); *B01D 2253/204* (2013.01); *B01D 2257/504* (2013.01); *B01D 2258/0283* (2013.01); *B01J 2220/56* (2013.01)

(58) Field of Classification Search
CPC .... B01D 53/0462; B01D 53/02; B01D 51/10; B01D 53/0438; B01D 2258/0283; B01D 2257/504; B01J 20/3248; B01J 20/3206; B01J 20/226; B01J 2220/56
See application file for complete search history.

(56) References Cited

U.S. PATENT DOCUMENTS

| 9,968,882 B2 | 5/2018 | Weston et al. |
| 2011/0268618 A1 | 11/2011 | Finkenrath |
| 2014/0137780 A1* | 5/2014 | Boulet .................... F01K 17/04 |
| | | 110/345 |
| 2017/0087503 A1* | 3/2017 | Sundaram ............ B01J 20/3425 |
| 2017/0087531 A1* | 3/2017 | Long .................... B01J 20/3085 |

FOREIGN PATENT DOCUMENTS

JP    H0699035 A    4/1994

OTHER PUBLICATIONS

Thomas M. McDonald, Capture of Carbon Dioxide from Air and Flue Gas in the Alkylamine-Appended Metal-Organic Framework mmen-Mg2(dobpdc), Apr. 4, 2012, Journal of the American Chemical Society, vol. 134, Issue 16, pp. 7056-7065 (Year: 2012).*
McDonald et al., "Capture of Carbon Dioxide from Air and Flue Gas in the Alkylamine-Appended Metal-Organic Framework mmen-Mg2(dobpdc)", J. Am. Chem. Soc., 2012, 134, pp. 7056-7065.
McDonald et al., "Cooperative insertion of CO2 in diamine-appended metal-organic frameworks", Nature, 2015, 519, pp. 303-308.
Merkel et al., "Selective Exhaust Gas Recycle with Membranes for CO2 Capture from Natural Gas Combined Cycle Power Plants", Ind. Eng. Chem. Res., 2013, 52, pp. 1150-1159.
The International Search Report and Written Opinion of PCT/US2018/032268 dated Aug. 31, 2018.
McDonald et al., "Capture of Carbon Dioxide from Air and Flue Gas in the Alkylamine-Appended Metal-Organic Framework mmen-Mg2 (dobpdc)", J. Am. Chem. Soc., 2012, 134, 7056-7065.
McDonald et al., "Cooperative Insertion of CO2 in diamine-appended metal-organic frameworks", Nature, 2015, 519, 303-308.
Milner et al., "Diaminopropane-Appended Metal-Organic Framework Enabling Efficient CO2 Capture from Coal Flue Gas via a Mixed Adsorption Mechanism", J. Am. Chem. Soc., 2017, 139, 13541-13553.

* cited by examiner

*Primary Examiner* — Christopher P Jones
(74) *Attorney, Agent, or Firm* — Liza Negron (57) ABSTRACT

Systems and methods for concentration of a sorbate in a feedstream and subsequent adsorption utilizing a Type V adsorbent are provided.

20 Claims, 7 Drawing Sheets

USE OF TYPE V ADSORBENT AND GAS CONCENTRATION FOR GAS ADSORPTION AND CAPTURE

CROSS-REFERENCE TO RELATED APPLICATIONS

This application claims the benefit of U.S. Provisional Application No. 62/534,278, filed on Jul. 19, 2017, the entire contents of which are incorporated herein by reference

FIELD

Systems and methods are provided for improving the working capacity of adsorbents during swing adsorption processes through the use of Type V adsorbents and gas concentration to fine tune optimal gas adsorption conditions.

BACKGROUND

Gas separation is important in many industries and can typically be accomplished by flowing a mixture of gases over an adsorbent that preferentially adsorbs a more readily adsorbed component relative to a less readily adsorbed component of the mixture. One of the more important types of gas separation technology is swing adsorption, such as pressure swing adsorption (PSA). PSA processes rely on the fact that under pressure gases tend to be adsorbed within the pore structure of the microporous adsorbent materials or within the free volume of a polymeric material. The higher the pressure, the greater the amount of targeted gas component will be adsorbed. When the pressure is reduced, the adsorbed targeted component is released, or desorbed. PSA processes can be used to separate gases of a gas mixture because different gases tend to fill the micropore or free volume of the adsorbent to different extents.

Another important gas separation technique is temperature swing adsorption (TSA). TSA processes also rely on the fact that gases tend to be adsorbed within the pore structure of the microporous adsorbent materials or within the free volume of a polymeric material. When the temperature of the adsorbent is increased, the adsorbed gas is released, or desorbed. By cyclically swinging the temperature of adsorbent beds, TSA processes can be used to separate gases in a mixture when used with an adsorbent that is selective for one or more of the components in a gas mixture.

Conventional temperature swing adsorption (TSA) processes use a solid adsorbent for the selective adsorption of a desired gas component at a lower temperature followed by desorption of the component at higher temperature. A conventional solid adsorbent can correspond to a monolith type structure or to a bed of solid adsorbent particles.

Metal organic frameworks (MOFs), especially MOFs exhibiting a Type V isotherm profile, e.g. diamine appended MOFs such as 2,2-dimethyl-1,3-diaminopropane (dmpn) appended to $Mg_2$(dobpdc) (dobpdc=4,4'-dioxido-3,3'-biphenyldicarboxylate) and N,N'-dimethylethylenediamine (mmen) appended to $Mg_2$(dobpdc), have shown greatly improved working capacity and energy efficiency (i.e. low temperature of adsorption/desorption) in the adsorption of gases over known adsorbents in the prior art. One cannot take advantage of said improved capacities at low partial pressures of the sorbate gas, e.g. natural gas flue gas where $CO_2$ concentration is about 3-5%. This translates into low capture recovery performance. It would be advantageous to alter the concentration of the sorbate to exactly match the optimal capture properties of the adsorbent in highly energy efficient adsorbents such as Type V adsorbents.

All post-combustion ("PC") $CO_2$ capture technologies suffer from the disadvantage that the $CO_2$ in the flue gas is present at low pressure (just about 1 atm) and in low concentrations (3 to 15%). A large amount of energy is needed to separate the $CO_2$. For 90% recovery of 10% $CO_2$ in a flue gas at 1 atm, the $CO_2$ must be brought from 0.1 atm to 1 atm, and then further compressed to a delivery pressure of 150 atm. Analyses conducted at NETL shows that $CO_2$ capture and compression using a conventional absorption process raises the cost of electricity from a newly built supercritical PC power plant by 86%, from 64 cents/kWh to 118.8 cents/kWh (Julianne M. Klara, DOE/NETL-2007/1281, Revision 1, August 2007, Exhibit 4-48 LCOE for PC Cases). Aqueous amines are considered a state-of-the-art technology for $CO_2$ capture for PC power plants, but have a cost of $68/ton of $CO_2$ avoided) (Klara 2007, DOE/NETL-2007/1282). Developing methods that minimize the amount of energy and other costs will be necessary if $CO_2$ removal from flue gas is to be economical.

Methods for the removal of $CO_2$ from gas streams, include sorption with a solvent, adsorption with a sorbent, membrane separation, and cryogenic fractionation and combinations thereof. In sorption/desorption processes to capture $CO_2$, the energy needed to regenerate the sorbent or solvent is a large cost element.

SUMMARY

Systems and methods for adsorbing a gas component are provided herein, said systems and methods can be discussed interchangeably throughout the application. In one aspect, the method comprises providing a feedstream at a first temperature, the feedstream comprising a first concentration of a gas component; cooling the feedstream to a second temperature; the second temperature being lower than the first temperature; exposing the feedstream to a concentrator, thereby creating an enriched feedstream with a second concentration of the gas component; the second concentration of the gas component being higher than the first concentration of the gas component; exposing the enriched feedstream to adsorbent particles to produce an adsorbent effluent having a lower concentration of the gas component than the feedstream; wherein the adsorbent particles comprise a Type V adsorbent; and desorbing at least a portion of the gas component from the adsorbent particles at a desorption temperature greater than the second temperature. In some cases, the concentrator comprises a membrane, a metal organic framework, or a combination thereof. In other cases, the enriched feedstream is produced by combusting a pre-combustion feedstream at enriched $O_2$ levels, thereby creating a post-combustion feedstream enriched in $CO_2$.

Cooling of the feedstream can occur upstream of the adsorbent particles, upstream of the concentrator, concurrently with contacting the feedstream with the adsorbent particles, and/or, a combination thereof. In cases where the feedstream is cooled concurrently with contacting the feedstream with the adsorbent particles, cooling may be achieved via trickle bed contactor, hollow fiber contactors, parallel channel monoliths with alternating gas and liquid channels, shell/tube heat exchangers, or a combination thereof.

In certain aspects, the first concentration of the gas component is from 1-10 vol %. In other aspects, the second concentration of the gas component is about 10-25 vol %. In certain aspects the second concentration of the gas component is selected based on the lower level capture limit (defined below) of the Type V adsorbent. The target gas component can be $CO_2$. The feedstream itself can be any number of streams containing gaseous components, such as a combustion flue gas, natural gas, and/or natural gas combustion flue gas. The desorption temperature can be at least 20° C. higher than the adsorption temperature, e.g. 20-40° C., 20-70° C., or 20-100° C.

In other aspects, a loading of adsorbed gas component in the adsorbent particles after the desorbing is less than 50% of the loading of the gas component in the adsorbent particles at the end of the exposing. In yet another aspect, exposing the input fluid to the adsorbent particles comprises exposing the input fluid to the adsorbent particles in a slurry contactor, a fluidized bed contactor, a trickle bed contactor, hollow fiber contactors, parallel channel monoliths with alternating gas and liquid channels, shell/tube heat exchangers, or a combination thereof. The adsorbent particles may comprise an amine appended metal organic framework, such as mmen-$Mg_2$(dobpdc) and/or dmpn-$Mg_2$(dobpdc).

DETAILED DESCRIPTION OF THE EMBODIMENTS

Definitions

As used herein, the term "breakthrough" refers to the point at which an effluent sorbate concentration is substantially equal to an influent sorbate concentration after exposure to an adsorption bed, which is caused by the adsorption bed being saturated with the sorbate.

As used herein, the term "bypass" refers to the point at which an increase in an effluent sorbate concentration is seen due to the adsorption isotherm for the particular adsorbent being inactive for sorbate adsorption at a given partial pressure of sorbate in the influent feedstream.

As used herein, "lower level capture limit" refers to the partial pressure or concentration of sorbate in an influent feedstream below which bypass occurs for a given adsorption isotherm.

Overview

Swing adsorption processes can have an adsorption step in which a feed mixture (typically in the gas phase) is flowed over and/or exposed to an adsorbent that can preferentially adsorb a more readily adsorbed component relative to a less readily adsorbed component. A component may be more readily adsorbed because of kinetic or equilibrium properties of the adsorbent. The adsorbent is typically contained in a contactor that is part of the swing adsorption unit. In this discussion, a contactor can contain a particulate adsorbent bed, or alternatively the particulate adsorbent can be suspended in a heat transfer fluid to form a slurry. Other components in the swing adsorption unit can be valves, piping, tanks, and other contactors. In some aspects, a plurality of contactors can be used as part of a swing adsorption system. This can allow adsorption and desorption to be performed as a continuous process, with one or more contactors being used for adsorption while one or more additional contactors are used for desorption. As contactors approach maximum loading during adsorption and/or approach complete desorption under the desorption conditions, the flows to the contactors can be switched between adsorption and desorption. It is noted that after the desorption step, the adsorbent may retain a substantial loading of the gas component. In various aspects, the loading of the adsorbent with the adsorbed gas component at the end of the desorption step can be at least about 0.001 mol/kg, or at least about 0.01 mol/kg, or at least about 0.1 mol/kg, or at least about 0.2 mol/kg, or at least about 0.5 mol/kg, or at least about 1.0 mol/kg, and/or about 3.0 mol/kg or less, or about 2.5 mol/kg or less, or about 2.0 mol/kg or less, or about 1.5 mol/kg or less, or about 1.0 mol/kg or less, or about 0.1 mol/kg or less. Additionally or alternately, the loading at the end of the desorption step can be characterized relative to the loading at the end of the prior adsorption step. The loading of the adsorbent with the adsorbed gas component at the end of the desorption step can be at least about 0.01% of the adsorbent loading at the end of the prior adsorption step, or at least about 0.1%, or at least about 1%, or at least about 5%, or at least about 10%, or at least about 20%, or at least about 30%, or at least about 50%, and/or about 90% or less, or about 70% or less, or about 50% or less, or about 40% or less, or about 30% or less, or about 20% or less, or about 10% or less, or about 5% or less, or about 1% or less, or about 0.1% or less.

The method of adsorbent regeneration designates the type of swing adsorption process. Pressure swing adsorption (PSA) processes rely on the fact that gases under pressure tend to be adsorbed within the pore structure of the microporous adsorbent materials. The higher the pressure, the greater the amount of targeted gas component that will be adsorbed. When the pressure is reduced, the adsorbed targeted component is released, or desorbed. PSA processes can be used to separate gases of a gas mixture because different gases tend to fill the micropore or free volume of the adsorbent to different extents due to either the equilibrium or kinetic properties of the adsorbent. Temperature swing adsorption (TSA) processes also rely on the fact that gases tend to be adsorbed within the pore structure of the microporous adsorbent materials. When the temperature of the adsorbent is increased, the adsorbed gas is released, or desorbed. By cyclically swinging the temperature of adsorbent beds, TSA processes can be used to separate gases in a mixture when used with an adsorbent that is selective for one or more of the components in a gas mixture.

Temperature swing adsorption (TSA) processes, also referred to as thermal swing adsorption processes, can employ an adsorbent that is repeatedly cycled through at least two steps—an adsorption step and a thermally assisted regeneration step. Regeneration of the adsorbent can be achieved by heating the adsorbent to an effective temperature to desorb target components from the adsorbent. The adsorbent can then be cooled so that another adsorption step can be completed. The cycle time between successive adsorption steps for TSA process can typically be on the order of minutes, such as from about 0.2 minutes to about 120 minutes or more. In some aspects, the cycle time between successive adsorption steps for a TSA process can be less than about 30 minutes, or less than about 10 minutes, or less than about 2 minutes, or less than about 1 minute. The cycle time can depend in part on the nature of the adsorbent bed, such as the depth of the bed for a trickle bed contactor. TSA processes can be used to obtain very high product recoveries in the excess of 90 vol %, for example greater than 95 vol % or, in some cases, greater than 98 vol %. The term "adsorption" as used herein includes physisorption, chemisorption, and condensation onto a solid support, absorption into a solid supported liquid, chemisorption into a solid supported liquid, and combinations thereof.

A TSA cycle can also typically include a change in the temperature of the adsorbent from the temperature for the adsorption step to the temperature for the desorption step. The adsorption step can be defined based on the time when the gas flow is started for the input gas containing the component for adsorption and when the gas flow is stopped. The desorption step can be defined based on the time when gas being desorbed from the adsorbent is collected to the time collection is stopped. Any time in the cycle outside of those steps can be used for additional adjustment of the adsorbent temperature. In some aspects, a heat transfer fluid can allow a TSA cycle to be performed that corresponds to only the adsorption step and the desorption step, as the heat transfer fluid can allow an adsorption/desorption step to be started without necessarily requiring an intervening step to adjust the temperature of the bed.

A potential advantage of a TSA separation can be that the process can be performed at a convenient pressure, or with a small amount of variation around a convenient pressure. For example, a goal of a TSA separation can be to develop a substantially pure stream of a gas component that is adsorbed and then desorbed. In this type of aspect, a convenient pressure for the desorption step can be a temperature of about 1 bar (100 kPa) or less. Attempting to desorb a stream at greater than about 100 kPa can require substantial additional temperature increase for desorption. Additionally, ambient pressure can be a convenient pressure for the adsorption step as well, as many streams containing a gas component for adsorption can correspond to "waste" or flue gas streams that may be at low pressure. In some aspects, the pressure difference between the adsorption and desorption steps can be about 1,000 kPa or less, or about 200 kPa or less, or about 100 kPa or less, or about 50 kPa or less, or about 10 kPa or less.

A variety of types of solid adsorbents are available for separation of components from a gas flow using temperature swing adsorption (TSA). During a conventional TSA process, at least one component in a gas flow can be preferentially adsorbed by the solid adsorbent, resulting in a stream with a reduced concentration of the adsorbed component. The adsorbed component can then be desorbed and/or displaced from the solid adsorbent, optionally to form a stream having an increased concentration of the adsorbed component.

In this description, reference may be made at various locations to adsorbing $CO_2$ from a gas feed and subsequently desorbing a substantially pure $CO_2$ stream. This example is used to illustrate concepts, and those of skill in the art will understand that the general principles illustrated can be applied to any convenient combination of gas component and adsorbent for performing temperature swing adsorption. In this illustrative example, a flue gas from a refinery process or a gas power plant can have a $CO_2$ concentration of about 0.1 vol % to about 10 vol %. It would be desirable to be able to adsorb $CO_2$ from the flue gas stream and then desorb the $CO_2$ to form a concentrated $CO_2$ stream, such as a stream having at least 90 vol % $CO_2$, or at least 95 vol %, or at least 98 vol %. The amount of $CO_2$ (or another gas component) that can be adsorbed and then desorbed as part of an adsorption/desorption cycle is referred to as a working capacity for the adsorbent with respect to $CO_2$/the gas component.

Type V Isotherm Adsorbents

Figure 1:
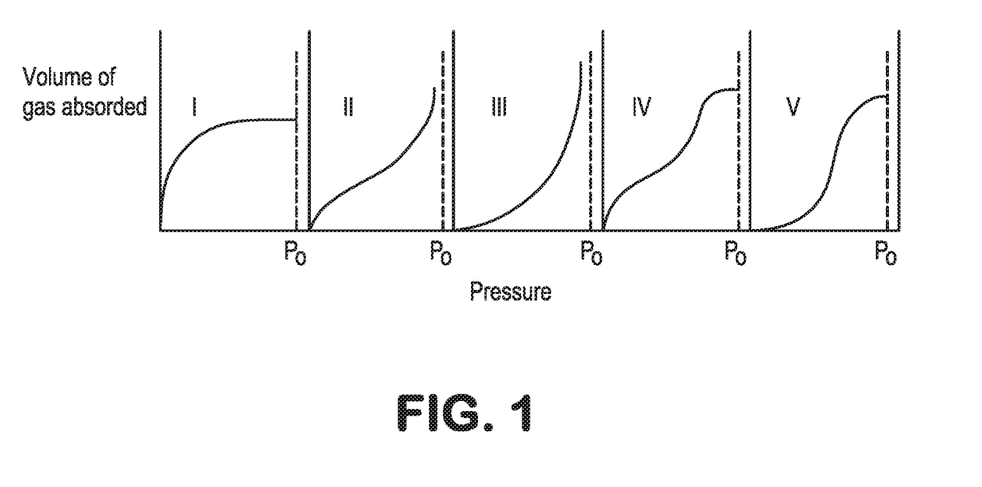
FIG. 1 schematically shows an example of adsorption isotherms of a gas by Types I-V adsorbents.

Adsorbents can be characterized based on the type of adsorption isotherm the adsorbent has for a given gas component. Adsorbents can generally be classified into six types based on the 1985 IUPAC classification of adsorption isotherms. Type I adsorbents have adsorption isotherms that correspond to monolayer adsorption of a gas component and that can generally be represented by a Langmuir Adsorption Isotherm. For a Type I isotherm, a monolayer can be readily adsorbed, with little or no additional adsorption beyond a monolayer as pressure increases. Type II adsorbents have adsorption isotherms corresponding to multi-layer adsorption, with a plateau at intermediate pressures corresponding to monolayer adsorption. Type III adsorbents exhibit multi-layer adsorption without an intermediate plateau corresponding to monolayer adsorption. Type IV and Type V adsorbents are similar to Type II and Type III adsorbents, respectively, but correspond to adsorbents having micropores and/or mesopores that can allow for capillary condensation. This can result in hysteresis in adsorbent behavior. Type VI isotherms represent a stepwise adsorption process, in which successive two-dimensional phase transitions may take place. It is noted that some adsorbents may not have "isotherms" for adsorption under the strict definition of an isotherm. This can be due, for example, to structural and/or phase changes that occur in the adsorbent as the temperature changes. In this discussion, adsorbents are defined as Type I-Type VI adsorbents based on the corresponding IUPAC classification, even if the shape of the adsorption profile does not represent a true "isotherm" due to changes in the adsorbent structure during adsorption. FIG. 1 provides schematic representations of typical adsorption isotherms for Types I-V.

In various aspects, processes are provided herein to adjust the concentration of a gaseous sorbate within an input fluid to optimize the capture properties of highly energy efficient adsorbents (such as Type V adsorbents). Because of the stepwise nature of the Type V isotherms, the working capacity for adsorbents like mmen-$Mg_2$(dobpdc) and dmpn-$Mg_2$(dobpdc) can be similar to the total adsorption capacity, such as at least about 80% of the total capacity at the adsorption conditions, or at least about 90% of the total capacity. This is in contrast to the working capacity for many typical adsorbents having Type I isotherms, where the working capacity is less than about 1 mol/kg and/or the working capacity corresponds to less than about 50% of the total adsorbent capacity at the adsorption conditions. Again, the description below focuses on the exemplary case of removing $CO_2$ from a natural gas power plant's flue gas, but it should be appreciated by those of skill in the art that the general processes described herein can be applied to any gas sorbate wherein the concentration of that sorbate can be adjusted to maximize adsorption on the high capacity adsorbent, such as Type V adsorbents, while also avoiding bypass.

Figure 2:
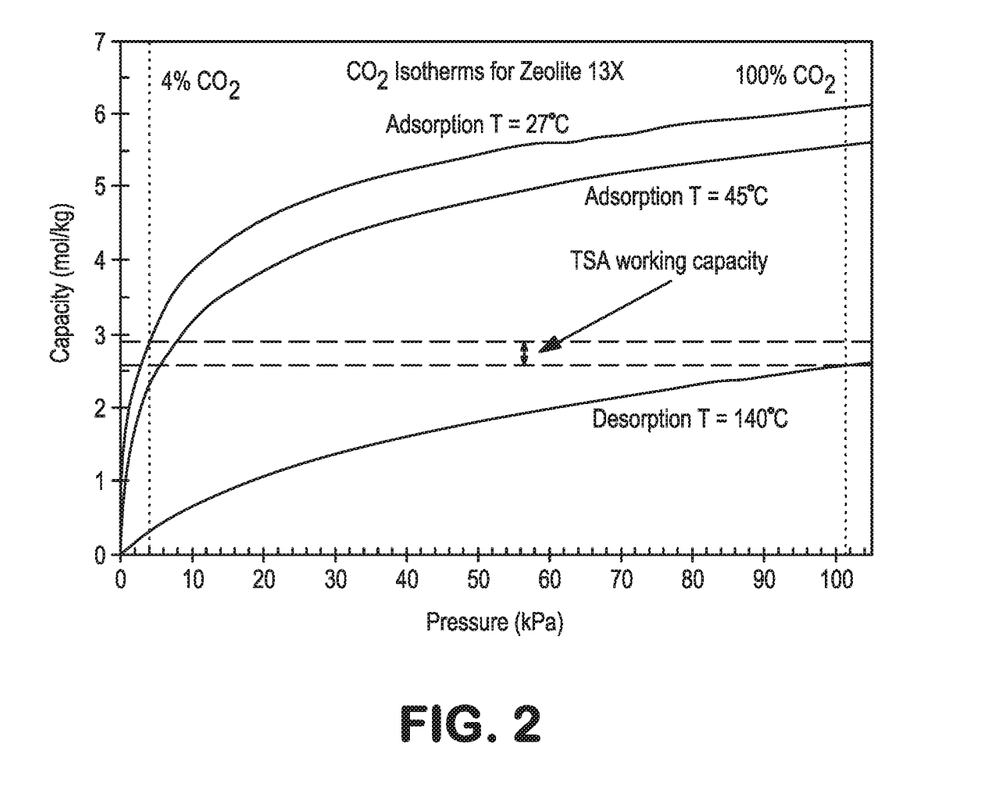
FIG. 2 schematically shows an example of adsorption isotherms and potential working capacity for adsorption of $CO_2$ by a Type I adsorbent.

FIG. 2 shows an example of $CO_2$ adsorption isotherms for zeolite 13X, which exhibits a Type I adsorption isotherm. It is noted that use of zeolite 13X for adsorption/desorption of $CO_2$ can pose some difficulties due to the presence of $H_2O$ in typical flue gases. However, zeolite 13X is suitable for illustrating the concepts of an adsorption/desorption cycle. In FIG. 2, a $CO_2$ concentration of 4 vol % was selected as a representative dilute concentration for $CO_2$, such as a concentration of $CO_2$ that might occur in a flue gas. In FIG. 2, the vertical dotted lines show the partial pressure of $CO_2$ (at 4 kPa or 100 kPa) that corresponds to a concentration of either 4 vol % or 100 vol %. As shown in FIG. 2, the adsorption isotherm changes with temperature, with lower temperatures corresponding to higher amounts of adsorbed $CO_2$ at a given temperature.

One method for determining a working capacity is based on adsorption isotherms for a gas component/solid adsorbent combination. Using the adsorption isotherms, and based on an expected concentration of the gas component during adsorption and desorption, the working capacity can be calculated as the difference in the adsorbed amount of the gas component under the adsorption and desorption conditions. The values shown in FIG. 2 can allow for determination of a working capacity for $CO_2$ adsorption by zeolite 13X at an adsorption temperature of 27° C. and a desorption temperature of 140° C. Based on the values of FIG. 2, at a total pressure of about 100 kPa, the working capacity of the adsorbent is about 0.5 moles $CO_2$ per kilogram of adsorbent, as shown by the horizontal lines in FIG. 2. The intersection of the 27° C. isotherm and the dotted vertical line corresponding to 4 vol % $CO_2$ represents the adsorption capacity of the adsorbent for adsorption of $CO_2$ from a gas stream during a hypothetical adsorption step at 100 kPa and 27° C., which is about 3 mol $CO_2$/kg. Similarly, the intersection of the 140° C. isotherm and the dotted vertical line corresponding to 100% $CO_2$ represents the expected amount of $CO_2$ retained by the adsorbent when attempting to desorb a substantially pure $CO_2$ stream at 140° C. and 100 kPa, which is about 2.5 mol $CO_2$/kg. The horizontal lines in FIG. 2 illustrate the difference in these values, corresponding to the working capacity of about 0.5 mol $CO_2$/kg.

The above calculation of a working capacity based on the 27° C. isotherm and the 140° C. isotherm represents an idealized value for the working capacity. Unfortunately, real working capacities for adsorbents are typically lower than the idealized value due to temperature increases in an adsorbent during the adsorption portion of a cycle. When a gas component is adsorbed by a solid adsorbent, an amount of heat corresponding to a heat of adsorption can be generated. This generated heat typically leads to an increase in the temperature of the adsorbent, due in part to the limited heat capacity of a gas flow to transport heat away from the adsorbent. For an adsorption amount roughly corresponding to a mole per kilogram, the corresponding temperature increase of the adsorbent can be on the order of tens of degrees Celsius. FIG. 2 shows an example of how this increase in the temperature of the adsorbent can impact the working capacity. For the example shown in FIG. 2, an increase in the adsorbent temperature from 27° C. to 45° C. (a representative temperature increase which could occur based on adsorption of a gas component by an adsorbent) can shift the isotherm. At 45° C. the working capacity of the adsorbent would be reduced even further, e.g., to about 0 moles per kilogram assuming a desorption temperature of 140° C.

For a classical Type I adsorbent the steepness of the isotherm gradually diminishes as the temperature increases (as shown in FIG. 2), necessitating a high desorption temperature to achieve a large working capacity for a separation. In contrast, in Type V adsorbent isotherms, the position of the isotherm step shifts markedly to higher pressures as the temperature increases, such that a large working capacity can be achieved with only a small increase in temperature. For an efficient carbon capture process with high $CO_2$ recovery (i.e. high $CO_2$ removal from the flue gas) and high $CO_2$ purity in the product stream, one would ideally create a Type V adsorbent with a large vertical step positioned below the partial pressure of $CO_2$ in the flue gas needed to achieve the desired $CO_2$ recovery, i.e. at the lower level capture limit of the adsorbent.

Type V isotherm adsorbents have great potential as high working capacity adsorbents but suffer from low capture rates at low partial pressures. That is, an adsorbent with a Type V adsorption step to capture ≥90% of the $CO_2$ from a natural gas power plant flue gas of 4% $CO_2$ is challenging because the adsorbent would have to capture $CO_2$ down to ≤0.4% while having a desorption temperature lower than the temperature at which the appended diamine starts to be lost due to volatilization or degradation. Indeed capture at the lower $CO_2$ partial pressures goes in hand with high desorption temperatures. Thus, the input sorbate's partial pressure and the gas temperature during adsorption become critical parameters for process design. Temperature can be varied but temperatures approaching and below room temperature become cost prohibitive.

Figure 3:
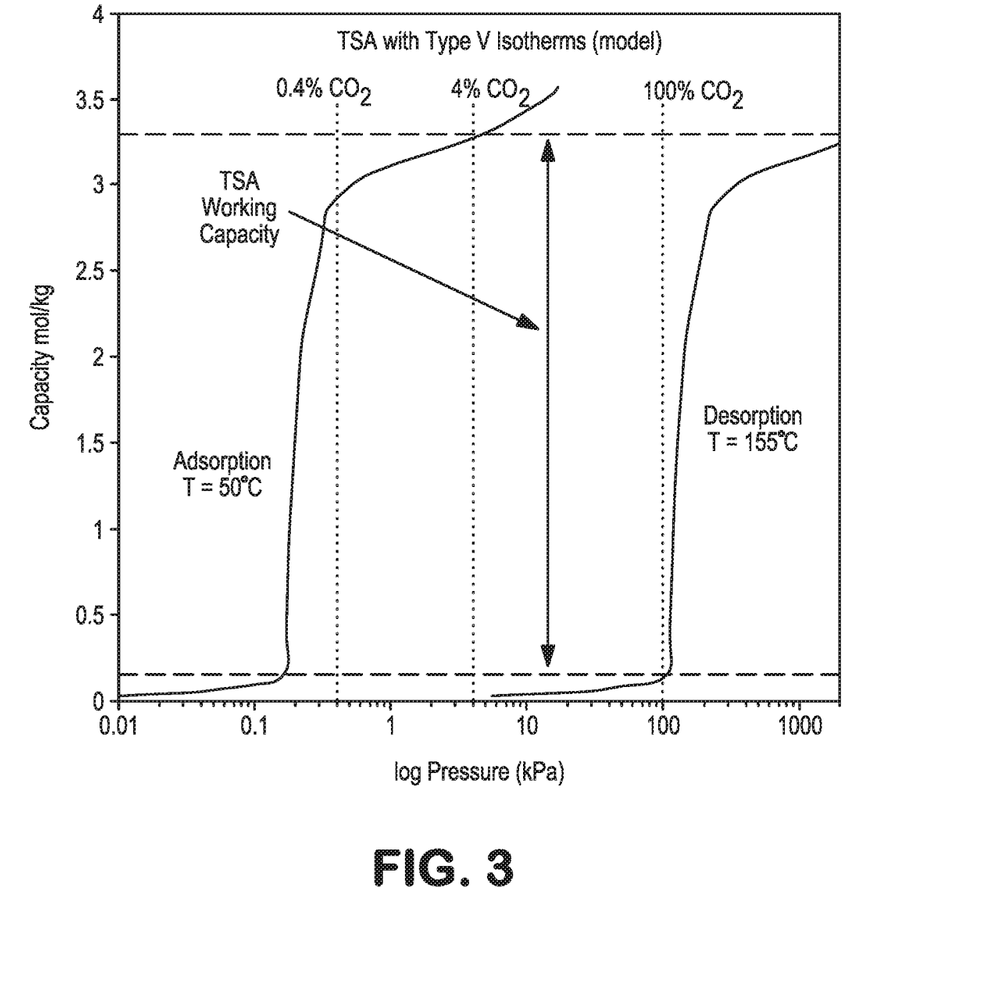
FIG. 3 schematically shows an example of adsorption isotherms and potential working capacity for adsorption of $CO_2$ by a Type V adsorbent.

FIG. 3 shows an example of $CO_2$ isotherms (calculated using an empirical model) for a material that is a Type V adsorbent for $CO_2$. The modeled material in FIG. 3 is mmen-$Mg_2$(dobpdc). This material has an expanded MOF-74 structure, with the mmen being a diamine functionalization of the 18.4 Angstrom channels in the structure. Additional details regarding the material can be found, for example, in mmen-$Mg_2$(dobpdc) adsorbent, Thomas M. McDonald, Woo Ram Lee, Jarad A. Mason, Brian M. Wiers, Chang Seop Hong, and Jeffrey R. Long, J. Am. Chem. Soc. 2012, 134, 7056-7065. FIG. 3 models $CO_2$ adsorption of a feedstream with 4% $CO_2$ with a desired $CO_2$ reduction of 90%, i.e., a reduction to 0.4% $CO_2$. As shown this $CO_2$ reduction goal can be achieved at an adsorption temperature of 50° C. and a desorption temperature of 155° C.

Figure 4A:
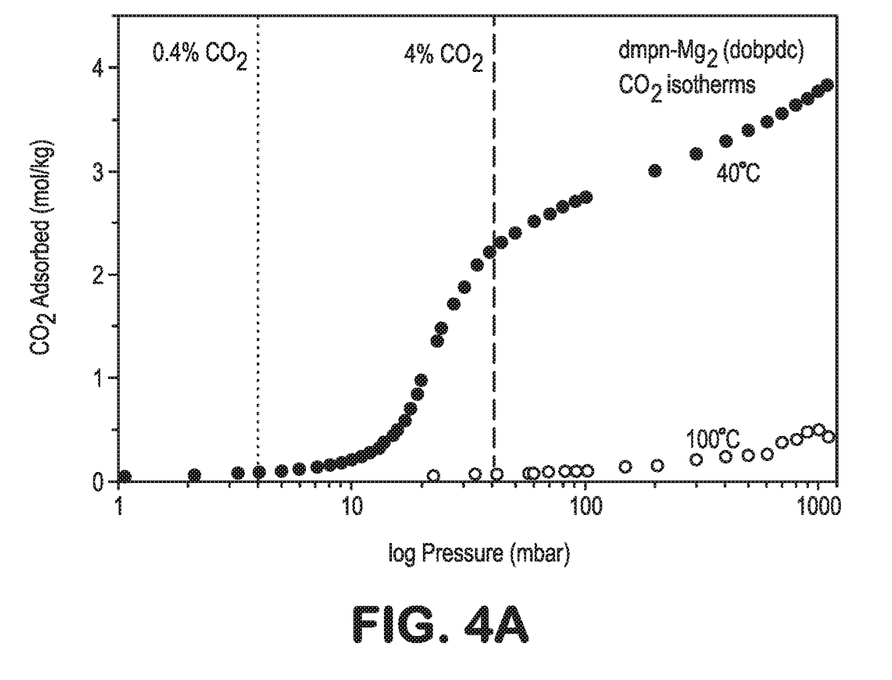
FIGS. 4A & 4B schematically show an example of adsorption isotherms and potential working capacity for adsorption of $CO_2$ by a Type V adsorbent at an inadequate $CO_2$ concentration and preferred $CO_2$ concentration, respectively.
Figure 4B:
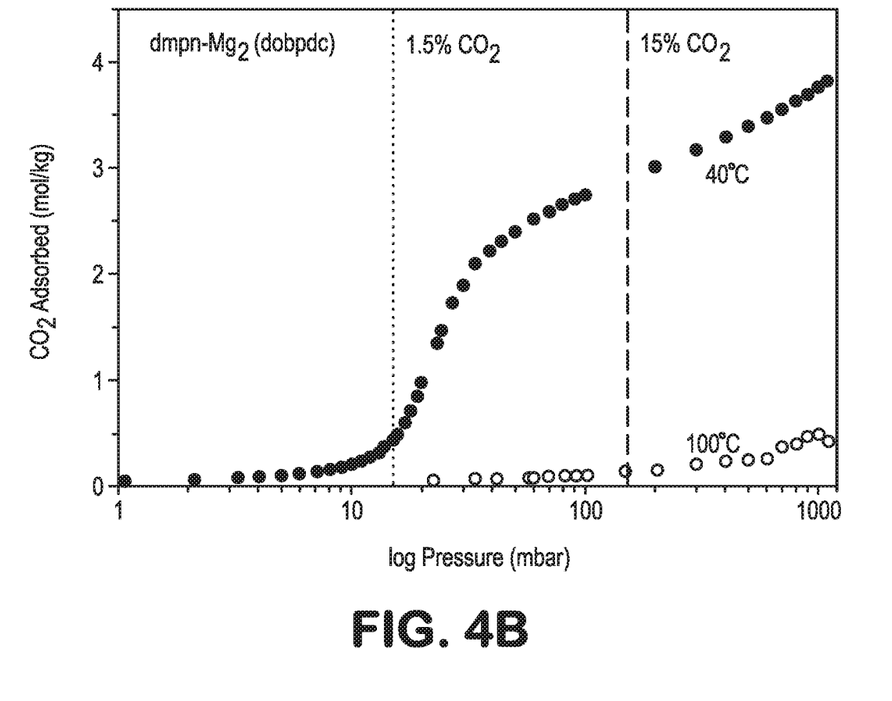

FIGS. 4A and 4B show an example of $CO_2$ isotherms for a material that is a Type V adsorbent for $CO_2$ at differing levels of $CO_2$ in the feedstream. The material in FIGS. 4A and 4B is dmpn-$Mg_2$(dobpdc) (Milner, Phillip J., et al., "A Diaminopropane-Appended Metal-Organic Framework Enabling Efficient $CO_2$ Capture from Coal Flue Gas Via a Mixed Adsorption Mechanism", Journal of the American Chemical Society, 2017, 139, 13541-13553). FIG. 4A illustrates the case where there is insufficient $CO_2$ concentration in the feed to effectively take advantage of the Type V adsorbent's working capacity and avoid bypass of $CO_2$ through the adsorbent. The dashed line on the isotherm illustrates adsorption of a natural gas power plant flue gas, which has a $CO_2$ concentration of about 4% (40 mbar). In order to decrease the $CO_2$ concentration by 90%, the isotherm should show sufficient adsorption at a $CO_2$ concentration of about 0.4% (4 mbar) defined by the dotted line. Using an adsorption temperature of 40° C. and a desorption temperature of 100° C., we see in FIG. 4A that at 0.4% $CO_2$, there is negligible adsorption (~0.08 mol/kg), which means that a significant amount of $CO_2$ is bypassing the adsorbent entirely. Lowering the temperature of the flue gas could shift the isotherm to the left on the plot, but lowering an adsorption temperature below 40° C. becomes prohibitively expensive in refinery and power plant conditions. A better option, which is disclosed herein is to shift the operating window by increasing the partial pressure of $CO_2$ in the feedstream—i.e. increase the $CO_2$ concentration of a natural gas power plant flue gas to more closely mimic the $CO_2$ concentration of a coal power plant flue gas.

FIG. 4B practically illustrates the advantage of including a $CO_2$ concentrator in the process to effectively take advantage of the Type V adsorption isotherm profile. The isotherm shown in 4B relates to a feedstream that has been concentrated to ~15% or ~150 mbar $CO_2$ with an adsorption temperature of 40° C., a desorption temperature of 100° C., and a $CO_2$ reduction of at least 90% to ~1.5% or ~15 mbar. Thus, in order to achieve this reduction goal at the specified temperatures, one would want an adsorbent displaying a step change at approximately 15 mbar or lower, which FIG. 4B clearly shows (step change, or lower level capture limit, occurring at about 10 mbar). At the 1.5% $CO_2$ level, $CO_2$ is still being adsorbed at about 0.45 mol/kg.

Thus, provided herein is a gas concentrator to increase the concentration of a sorbate gas to a level to optimize the adsorption characteristics of the high capacity adsorbent. Post combustion concentration of $CO_2$ in natural gas flue gas is known in the art and can be accomplished in a number of different ways. For example, U.S. Publication No. 2017/0087503 to Sundaram, which is incorporated here by reference, describes a two-stage adsorbent and process whereby a first TSA adsorption process is used as a $CO_2$ concentrator to form a $CO_2$ rich stream to be further separated in a second stage adsorption process. Sundaram describes a number of adsorbent contactors to be used in the process such as parallel plate contactors, adsorbent monoliths, and metal organic frameworks. In a publication by Merkel, T. C. et al., *Selective Exhaust Gas Recycle with Membranes for $CO_2$ Capture from Natural Gas Combined Cycle Power Plants*, 52 INDUS. & ENG'G CHEM. RES. 1150-59 (2013), which is incorporated here by reference, the authors describe exhaust gas recycle processes whereby natural gas flue gas is contacted with a membrane selective for $CO_2$ over $O_2$ and $N_2$ to create a $CO_2$-enriched permeate stream.

Additionally or alternatively, $CO_2$ concentration in an exhaust stream can be enriched prior to combustion by providing an oxidant enriched in $O_2$. For example, if the fuel is methane and the oxidant is air, then exhaust stream has a $CO_2$ concentration of about 4%. One could enrich the air with oxygen, thereby increasing the exhaust $CO_2$ concentration.

Another necessary aspect in working with Type V adsorbents is heat management. Natural gas power plant flue gas typically needs to be cooled prior to contact with an adsorbent bed—the flue gas typically exits a heat recovery steam generator at about 120° C. As shown in FIG. 3 when used as an adsorbent for a sorbate gas, Type V adsorbents can be highly sensitive to temperature increases. For process control, it can be desirable to cool the flue gas to an initial adsorption temperature that is greater than ambient, so that the adsorption process is repeatable independent of ambient conditions and water co-adsorption is lower at higher temperatures which also leads to lower parasitic energy.

Additionally, heat is generated during the adsorption process. The heat generated during $CO_2$ adsorption of the about 3 mol/kg capacity of the adsorbent can increase the temperature of the adsorbent by about 50° C. or more. Under conventional conditions, this can lead to low actual working capacity and/or unpredictable working capacity. In the case of a Type V adsorbent such as mmen-$Mg_2$(dobpdc) such a temperature increase would allow $CO_2$ bypass. Thus, it can be beneficial to deploy cooling to the adsorbent bed itself. Using a cooler, the temperature increase during adsorption of $CO_2$ can be reduced or minimized, so that the temperature increase for the adsorbent should be less than the amount needed to keep the adsorption operating above the lower level capture limit, and such a temperature increase can be 25° C. or less, 20° C. or less, 15° C. or less, 10° C. or less, or 5° C. or less, or 2° C. or less. For this type of reduced or minimized temperature increase, an initial adsorption temperature can be selected that allows for adsorption of at least the full stepwise increase in the isotherm.

Accordingly, a heat management system is provided to reduce the temperature of the flue gas and/or minimize the temperature increase of the solid adsorbent that occurs during an adsorption cycle. Minimizing such a temperature increase can enhance the working capacity for an adsorbent and/or enable the use of adsorbents (such as Type V adsorbents) that are not practical for commercial scale adsorption using conventional adsorption methods. Example heat managed adsorbers include a trickle bed adsorber, as described in U.S. Publication No. 2017/0087506 incorporated in its entirety by reference, hollow fiber contactors, parallel channel monoliths (optionally 3D printed) with alternating gas and liquid channels, and shell/tube heat exchangers with adsorbent. This can allow for heat transfer in combination with using relative liquid/gas velocities in a way that the thermal front moves faster than the adsorption front. This can allow for improved heat recuperation and/or thermal management of the adsorbent. Any loss of adsorption capacity from heat of adsorption can be reduced or minimized, which can make the use of high capacity adsorbents more practical, including (but not limited to) Type V adsorbents. In the case of the trickle bed adsorber, the heat removal is so great that it may not be necessary to cool the incoming natural gas flue gas.

Contactor Configuration

Figure 5:
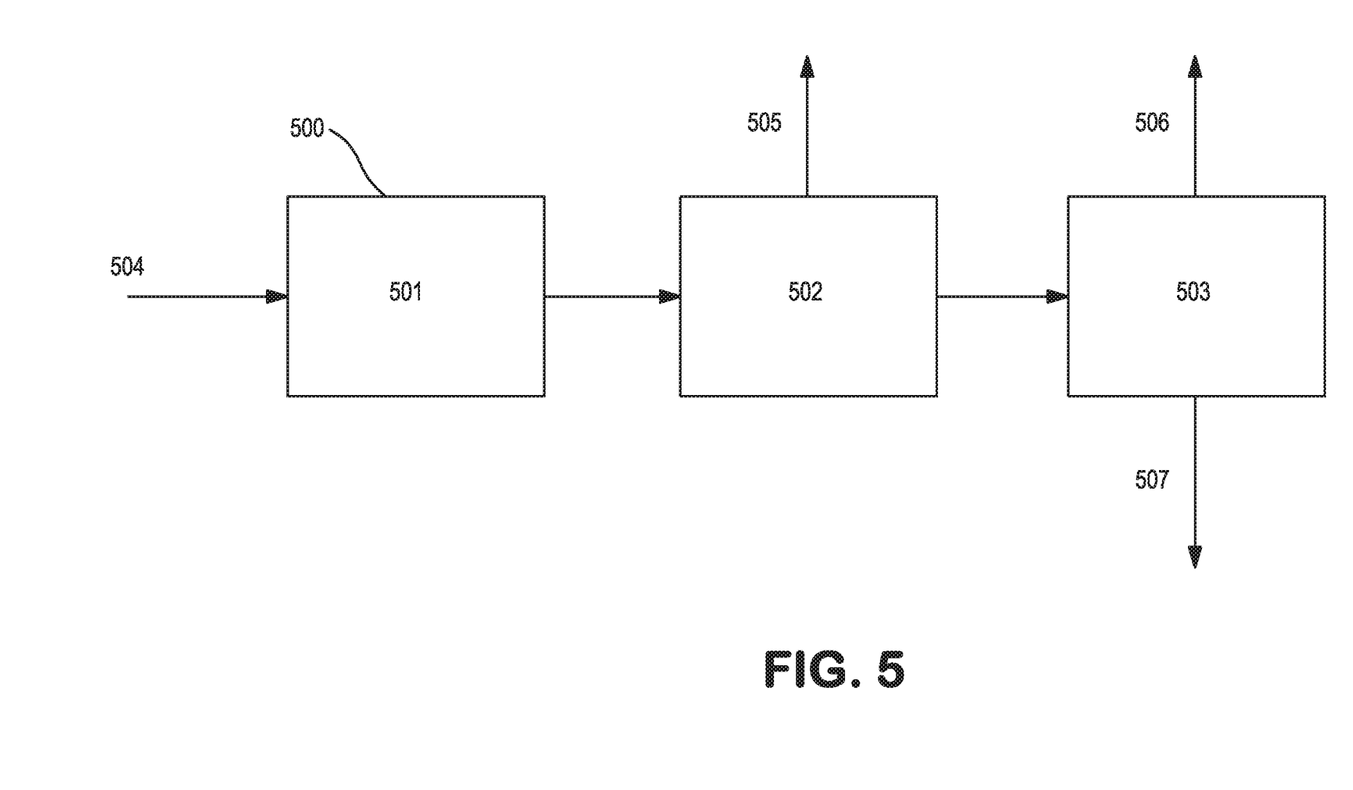
FIG. 5 schematically shows an example of a system suitable for performing a swing adsorption process described herein.

In various aspects, an improved Type V adsorbent contactor process and system are manipulating the partial pressure of a sorbate gas in a feedstream to maximize adsorption efficiency of the Type V adsorbent and to minimize bypass. FIG. 5 illustrates exemplary Type V contactor system 500. As shown, feedstream 504 containing a sorbate gas (e.g. flue gas from a natural gas power plant containing $CO_2$) is admitted to cooler 501 so as to bring the temperature of the feedstream to the appropriate adsorption temperature for adsorption in Type V adsorbent 503. The appropriate adsorption temperature will preferably be just above ambient temperatures, e.g. 20-70° C., 30-60° C., 40-50° C. The cooled feedstream is next admitted to concentrator 502, which produces a sorbate-rich stream and a sorbate-lean stream 505. The sorbate-rich stream is then admitted to Type V adsorbent contactor 503. The sorbate-lean stream can be recycled into feedstream 504 or can be routed to other refinery or power plant components for further processing. The sorbate-rich stream should have sufficient concentration of the sorbate gas such that the step-wise increase in the adsorption isotherm occurs below the desired partial pressure of sorbate gas in effluent stream 506. Effluent stream 506 will generally have a partial pressure (or concentration) of sorbate gas that is at least 80%, at least 85%, at least 90%, or at least 95% less that the partial pressure (or concentration) of the sorbate-rich stream. Temperature in the Type V adsorbent contactor 503 can then be raised to the desorption temperature for the adsorbed gas, which then creates desorbed stream 507, which can then be routed for sequestration. The desorption temperature is preferably less than 200° C., less than 175° C., less than 150° C., less than 125° C., or less than 100° C. It should be appreciated that the above parameters may also be stated in ranges, e.g. 80-95% reduction or 100-200° C., and all combinations of the above are contemplated.

It must be noted that this is merely an exemplary system and the system components can be merged or in different orders. For example, in the case of a trickle bed adsorber, the cooler 501 is incorporated in the Type V adsorbent 503. In the case of $O_2$ enriched combustion to produce higher concentration of $CO_2$ in the combustion effluent, the concentrator 502 occurs before the cooler 501.

EXAMPLES

Avoiding Bypass

Figure 6A:
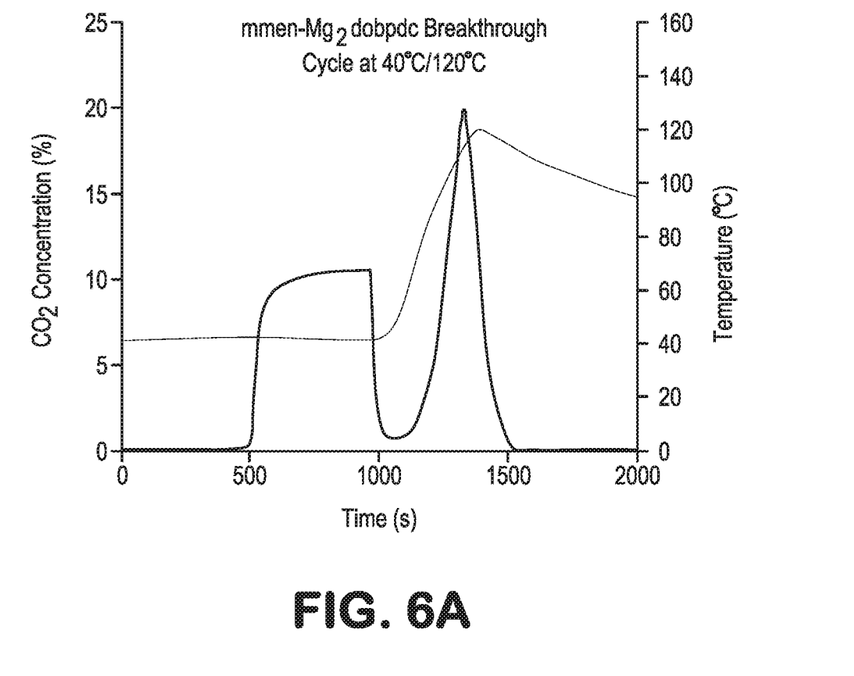
FIGS. 6A & 6B schematically show an example of breakthrough and bypass of $CO_2$ by a Type V adsorbent at 10% $CO_2$ feed concentration and an adsorption temperature of 40° C. and 75° C., respectively.
Figure 6B:
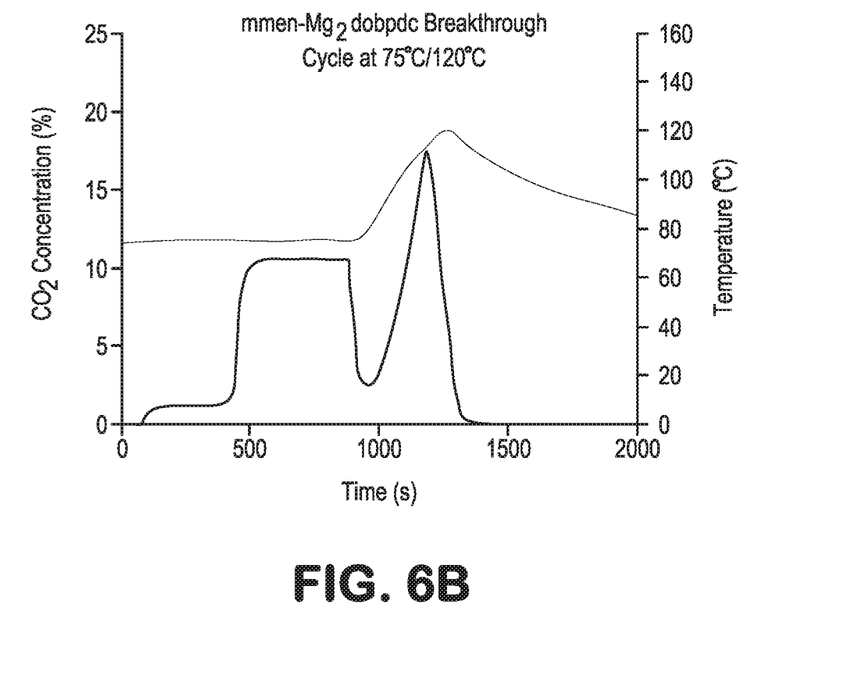

FIGS. 6A and 6B illustrate the affect that adsorption temperature can have on a Type V isotherm adsorbent. In FIG. 6A, the adsorbent bed is comprised of 209.6 mg mmen-$Mg_2$(dobpdc) adsorbent mixed with 1 g quartz chips to mitigate the temperature increase due to heat of adsorption. The bed was activated by exposure to a dry $N_2$ flow at 120° C. overnight. The feedstream is comprised of 10% $CO_2$ concentration with the balance $N_2$. The feedstream is introduced to the bed at a feed rate of 20 sccm (standard cubic centimeter per minute). The adsorption temperature is 40° C. and the desorption temperature is 120° C. The graph depicts $CO_2$ concentration in effluent stream and temperature. As shown, there is no $CO_2$ in the effluent stream, i.e. no bypass, until about 500 seconds, at which $CO_2$ concentration jumps to 10% indicating saturation or breakthrough of the adsorbent bed. Temperature is then increased to 120° C. to desorb the adsorbed $CO_2$, the desorption evidenced by the spike in $CO_2$ concentration occurring at about 1400 seconds.

FIG. 6B depicts all the same parameters described immediately above with respect to FIG. 6A except that adsorption temperature is raised to 75° C. (this is the equivalent of moving the adsorption isotherm depicted in FIG. 3 to the right). In this case, we begin to see $CO_2$ bypass of about 1.2% between 100 and 200 seconds. This means that at an adsorption temperature of 75° C., no $CO_2$ is adsorbed below 1.2% $CO_2$ concentration. Accordingly, a 90% reduction is $CO_2$ is unachievable with the mmen-$Mg_2$(dobpdc) adsorbent with a feedstream concentration of less than 12% $CO_2$ at an adsorption temperature of 75° C.

Figure 7A:
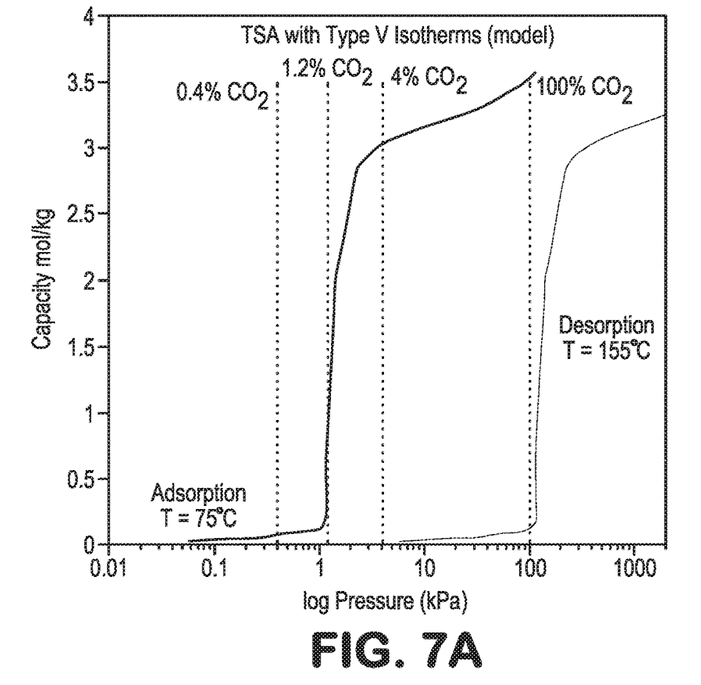
FIGS. 7A & 7B schematically show adsorption isotherms for adsorption of $CO_2$ at 75° C. at a $CO_2$ concentration of 4% and 15%, respectively.
Figure 7B:
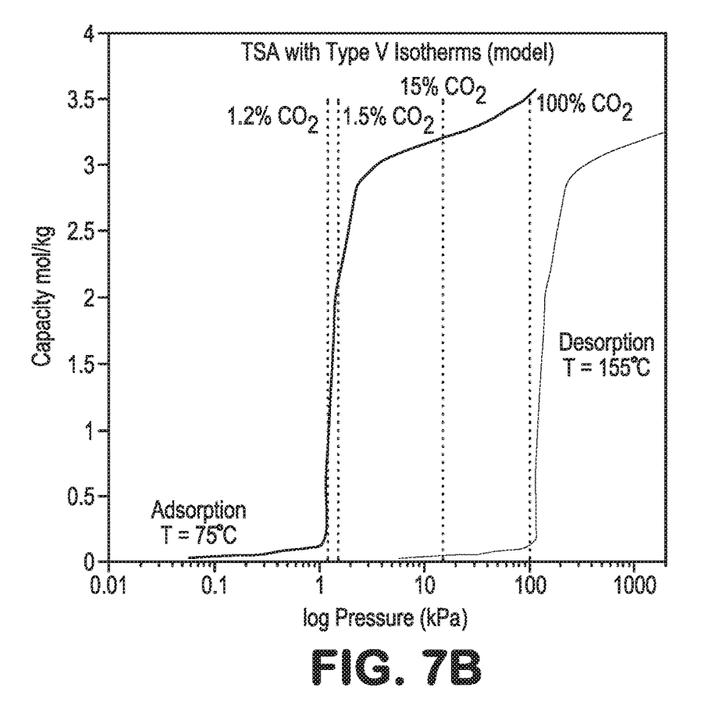

This is confirmed by plots 7A and 7B, which show experimental Type V adsorption isotherms for an adsorption temperature of 75° C. Specifically, we see that the stepwise increase in the isotherm, i.e. the lower level capture limit, occurs precisely at 1.2% $CO_2$ concentration, which corresponds to the point at which bypass is seen in FIG. 6B. Thus, in order to achieve 90% $CO_2$ adsorption one may employ any number of concentrators described herein to increase the $CO_2$ concentration of the feedstream to avoid bypass in the adsorbent bed. FIG. 7B shows that concentrating the $CO_2$ to 15% allows for a 90% reduction in $CO_2$ to 1.5% without bypass.

Additional Embodiments

Additionally or alternately, the present invention can include one or more of the following embodiments.

Embodiment 1. A method for adsorbing a gas component, comprising: providing a feedstream at a first temperature, the feedstream comprising a first concentration of a gas component; cooling the feedstream to a second temperature; the second temperature being lower than the first temperature; exposing the feedstream to a concentrator, thereby creating an enriched feedstream with a second concentration of the gas component; the second concentration of the gas component being higher than the first concentration of the gas component; exposing the enriched feedstream to adsorbent particles to produce an adsorbent effluent having a lower concentration of the gas component than the feedstream; wherein the adsorbent particles comprise a Type V adsorbent; and desorbing at least a portion of the gas component from the adsorbent particles at a desorption temperature greater than the second temperature.

Embodiment 2. The method of embodiment 1, wherein the second concentration of the gas component is selected based on the lower level capture limit of the Type V adsorbent.

Embodiment 3. The method of any of the previous embodiments, wherein the gas component comprises $CO_2$.

Embodiment 4. The method of any of the previous embodiments, wherein the feedstream is a combustion flue gas.

Embodiment 5. The method of any of embodiments 1-3, wherein the feedstream is a natural gas combustion flue gas.

Embodiment 6. The method of any of embodiments 1-3, wherein the feedstream is natural gas.

Embodiment 7. The method of any of the previous embodiments, wherein the first concentration of the gas component is about 1-10 vol %.

Embodiment 8. The method of any of the previous embodiments, wherein the second concentration of the gas component is about 10-25 vol %

Embodiment 9. The method any of the previous embodiments, wherein a loading of adsorbed gas component in the adsorbent particles after the desorbing is less than 50% of the loading of the gas component in the adsorbent particles at the end of the exposing.

Embodiment 10. The method of any of the previous embodiments, wherein the desorption temperature is greater than the second temperature by at least about 20° C.

Embodiment 11. The method of any of the previous embodiments, wherein the cooling the feedstream comprises cooling the feedstream upstream of the concentrator.

Embodiment 12. The method of any of the previous embodiments, wherein cooling the feedstream comprises cooling the feedstream concurrently with exposing the enriched feedstream to the adsorbent particles.

Embodiment 13. The method of embodiment 12, wherein the cooling is achieved via trickle bed contactor, hollow fiber contactors, parallel channel monoliths with alternating gas and liquid channels, shell/tube heat exchangers, or a combination thereof.

Embodiment 14. The method of any of the previous embodiments, wherein the concentrator comprises a membrane, a metal organic framework, or a combination thereof.

Embodiment 15. The method of any of the previous embodiments, wherein the feedstream is a post-combustion feedstream and the exposing the feedstream to a concentrator comprises: enriching a pre-combustion feedstream with $O_2$, and combusting the pre-combustion feedstream to produce the post-combustion feedstream enriched in $CO_2$.

Embodiment 16. The method of any of the previous embodiments, wherein the exposing the input fluid to the adsorbent particles comprises exposing the input fluid to the adsorbent particles in a slurry contactor, a fluidized bed contactor, a trickle bed contactor, hollow fiber contactors, parallel channel monoliths with alternating gas and liquid channels, shell/tube heat exchangers, or a combination thereof.

Embodiment 17. The method of any of the previous embodiments, wherein the adsorbent particles comprise an amine appended metal organic framework.

Embodiment 18. The method of embodiment 17, wherein the amine appended metal organic framework comprises one of mmen-$Mg_2$(dobpdc) and dmpn-$Mg_2$(dobpdc).

Embodiment 19. A system for separation of $CO_2$ from a gas flow, the system comprising: a contactor comprising a bed of adsorbent particles, the adsorbent particles comprising a Type V adsorbent, the adsorbent particles having an adsorbent loading of at least about 1.0 moles of $CO_2$ per kilogram of adsorbent; a cooling element located upstream of, or incorporated with, the contactor to receive an input fluid comprising $CO_2$; and a $CO_2$ concentrator located upstream of the contactor and in fluid connectivity with the contactor and the cooling element.

Embodiment 20. The system of embodiment 19, wherein the Type V adsorbent comprises an amine appended metal organic framework.

Embodiment 21. The system of embodiment 20, wherein the amine appended metal organic framework comprises one of mmen-$Mg_2$(dobpdc) and dmpn-$Mg_2$(dobpdc).

The invention claimed is:

1. A method for adsorbing a gas component, comprising:
providing a feedstream at a first temperature, the feedstream comprising a first concentration of a gas component;
cooling the feedstream to a second temperature; the second temperature being lower than the first temperature;
exposing the feedstream to a concentrator comprising a membrane, metal organic framework, or a combination thereof, thereby creating an enriched feedstream with a second concentration of the gas component; the second concentration of the gas component being higher than the first concentration of the gas component;
exposing the enriched feedstream to adsorbent particles to produce an adsorbent effluent having a lower concentration of the gas component than the feedstream; wherein the adsorbent particles comprise a Type V adsorbent; and
desorbing at least a portion of the gas component from the adsorbent particles at a desorption temperature greater than the second temperature.

2. The method of claim 1, wherein the second concentration of the gas component is above a lower level capture limit of the Type V adsorbent, wherein the lower level capture limit is a partial pressure of the gas component in the feedstream below which bypass occurs.

3. The method of claim 1, wherein the gas component consists essentially of $CO_2$.

4. The method of claim 1, wherein the feedstream is a combustion flue gas.

5. The method of claim 1, wherein the feedstream is a natural gas combustion flue gas.

6. The method of claim 1, wherein the feedstream is natural gas.

7. The method of claim 3, wherein the first concentration of the gas component is about 1-10 vol %.

8. The method of claim 5, wherein the second concentration of the gas component is about 10-25 vol %.

9. The method of claim 1, wherein a loading of adsorbed gas component in the adsorbent particles after the desorbing is less than 50% of the loading of the gas component in the adsorbent particles at the end of exposing the feedstream.

10. The method of claim 1, wherein the desorption temperature is greater than the second temperature by at least about 20° C.

11. The method of claim 1, wherein the cooling the feedstream comprises cooling the feedstream upstream of the concentrator.

12. The method of claim 1, wherein cooling the feedstream comprises cooling the feedstream concurrently with exposing the enriched feedstream to the adsorbent particles.

13. The method of claim 12, wherein the cooling is achieved via a trickle bed contactor, hollow fiber contactors, parallel channel monoliths with alternating gas and liquid channels, shell/tube heat exchangers, or a combination thereof.

14. The method of claim 1, wherein the feedstream is a post-combustion feedstream and the exposing the feedstream to a concentrator comprises:
enriching a pre-combustion feedstream with $O_2$, and
combusting the pre-combustion feedstream to produce the post-combustion feedstream enriched in $CO_2$.

15. The method of claim 1, wherein the adsorbent particles are exposed to an input fluid in a slurry contactor, a fluidized bed contactor, a trickle bed contactor, hollow fiber contactors, parallel channel monoliths with alternating gas and liquid channels, shell/tube heat exchangers, or a combination thereof.

16. The method of claim 1, wherein the adsorbent particles comprise an amine appended metal organic framework.

17. The method of claim 16, wherein the amine appended metal organic framework comprises one of N,N'-dimethylethylenediamine appended to $Mg_2$(4,4'-dioxido-3,3'-biphenyldicarboxylate) (mmen-$Mg_2$(dobpdc)) and 2,2-dimethyl-1,3-diaminopropane appended to Mg2(4,4'-dioxido-3,3'-biphenyldicarboxylate) (dmpn-$Mg_2$(dobpdc)).

18. A system for separation of $CO_2$ from a gas flow, the system comprising:
a contactor comprising a bed of adsorbent particles, the adsorbent particles comprising a Type V adsorbent, the adsorbent particles having an adsorbent loading of at least about 1.0 moles of $CO_2$ per kilogram of adsorbent;
a cooling element located upstream of, or incorporated with, the contactor to receive an input fluid comprising $CO_2$; and
a $CO_2$ concentrator comprising a membrane, metal organic framework, or a combination thereof, located upstream of the contactor and in fluid connectivity with the contactor and the cooling element.

19. The system of claim 18, wherein the Type V adsorbent comprises an amine appended metal organic framework.

20. The system of claim 19, wherein the amine appended metal organic framework comprises one of mmen-$Mg_2$(dobpdc) and dmpn-$Mg_2$(dobpdc).

* * * * *